Patented Oct. 7, 1930

1,777,943

UNITED STATES PATENT OFFICE

RICHARD THRELFALL, OF BIRMINGHAM, ENGLAND

MANUFACTURE OF ACTIVATED CARBON

No Drawing. Application filed May 31, 1927, Serial No. 195,588, and in Great Britain June 4, 1926.

In U. S. Letters Patent No. 1,586,106, of May 25, 1926, to Müller-Clemm and Schmidt, there is described a process of making a highly active charcoal by impregnating wood or other suitable vegetable material with a potassium sulphide or liver of sulphur and heating the impregnated material to incandescence with exclusion of air. The heating operation is concluded when the charcoal has been produced and the latter is then washed to remove the alkali salts which it contains.

As distinguished from this and similar processes for carbonizing wood with additions which affect the structure, and therefore the activity, of the charcoal produced, my invention relates to the activation of charcoal when it has been formed; that is to say, my invention may be applied to merchantable charcoal to convert it into an active or more highly active condition.

I have found that by heating charcoal with sulphur the charcoal acquires enhanced absorption properties. For example, by exposing charcoal for a sufficient time to vapor of sulphur, an active carbon is produced. The charcoal on leaving the furnace is, of course contaminated by sulphur and sulphur compounds, which are removed sufficiently for most purposes by allowing the charcoal to remain for a short time in an atmosphere otherwise free from sulphur at a temperature above the boiling point of sulphur, say 900° C.

The activated charcoal, if not already in a finely subdivided state, may be ground to any desired fineness, washed with a suitable acid, such as hydrochloric acid, sulphuric acid or a mixture thereof with hydrofluoric acid, followed by water, to remove some or all of the ash, and dried at a suitable temperature, say 300° C. To diminish the content of sulphur still further, the charcoal may be heated in an atmosphere of hydrogen at a high temperature, say 850° C. to 900° C.

The charcoal may be of any kind; that obtained from wood or peat has given good results. The temperature and duration of the operation of heating in sulphur vapor may vary greatly; for peat charcoal 950° C. continued for 9 hours has proved useful; good results have also been obtained from exposure to sulphur vapor for one hour, but the optimum period of exposure depends on the nature of the carbonaceous material employed, its state of division, rate of supply of sulphur and temperature.

During the treatment with sulphur the appearance of charcoal changes, the more active pieces showing increased blackness.

Of course, during the heating operation carbon bisulphide is produced, but the process differs from the ordinary manufacture of carbon bisulphide, in that, instead of following the usual practice of conducting the operation with a view to the maximum yield of carbon bisulphide per unit of charcoal and of plant, the production of carbon bisulphide may be stopped when the desired activation of the carbon has been achieved, and the residue is then treated as referred to above. The process may also be carried out by feeding carbonaceous matter to the reaction chamber and removing activated carbon continuously or intermittently.

The following example illustrates the invention, the parts being by weight—

140 parts of sulphur are placed below the perforated false bottom of a crucible and on this bottom are placed 50 parts of peat charcoal. The crucible is covered and heated for one hour at 950° C. A current of nitrogen is then passed into the crucible until all the sulphur has apparently been expelled. The cooled charcoal is now ground and washed first with hydrochloric acid of 15 per cent. strength and then with water and dried until its weight is about 22 parts. It may then be expected to contain 6.76 per cent. of sulphur.

To reduce this proportion of sulphur the charcoal is returned to the crucible and the latter is heated to 850–900° C. while nitrogen is passed into it and then hydrogen is substituted for the nitrogen and heating is continued for 15 minutes whereafter the charcoal may be allowed to cool in hydrogen, or nitrogen may be substituted for the hydrogen. The final product may be expected to contain about 2 per cent. of sulphur.

Having thus described the nature of my said invention and the best means I know of carrying the same into practical effect, I claim:—

1. The method of producing activated charcoal comprising heating charcoal with sulphur, subsequently treating the charcoal to remove sulphur and finally heating the charcoal in an atmosphere of hydrogen at a high temperature.

2. The method of producing activated charcoal comprising exposing charcoal at a high temperature to the vapor of sulphur, then heating the charcoal in an atmosphere free from such sulphur, then washing the charcoal with an acid followed by water, then drying the charcoal with aid of heat and finally heating the charcoal in an atmosphere of hydrogen at a high temperature.

3. The method of producing activated charcoal comprising exposing charcoal to the vapor of sulphur in the absence of an oxidizing temperature at a temperature at which carbon bisulphide is produced, then heating the charcoal at a temperature of about 900° C. in an atmosphere otherwise free from sulphur, then washing the charcoal with an acid followed by water and finally drying the charcoal at a temperature about 300° C.

4. The method of producing activated charcoal comprising exposing charcoal to the vapor of sulphur at a temperature at which carbon bisulphide is produced, then heating the charcoal at a temperature about 900° C. in an atmosphere otherwise free from sulphur, then washing the charcoal with an acid followed by water, then drying the charcoal at a temperature about 300° C. and finally heating the charcoal in an atmosphere of hydrogen at a temperature between 800° and 900° C.

In testimony whereof I have signed my name to this specification.

RICHARD THRELFALL.